W. BAHMULLER.
PLOW.
APPLICATION FILED APR. 29, 1914.
1,166,169.
Patented Dec. 28, 1915.
2 SHEETS—SHEET 1.
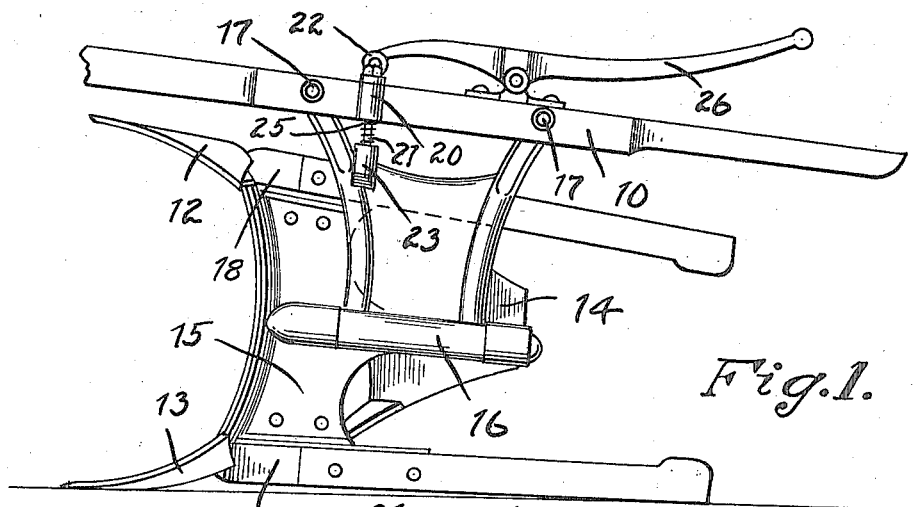
Fig. 1.
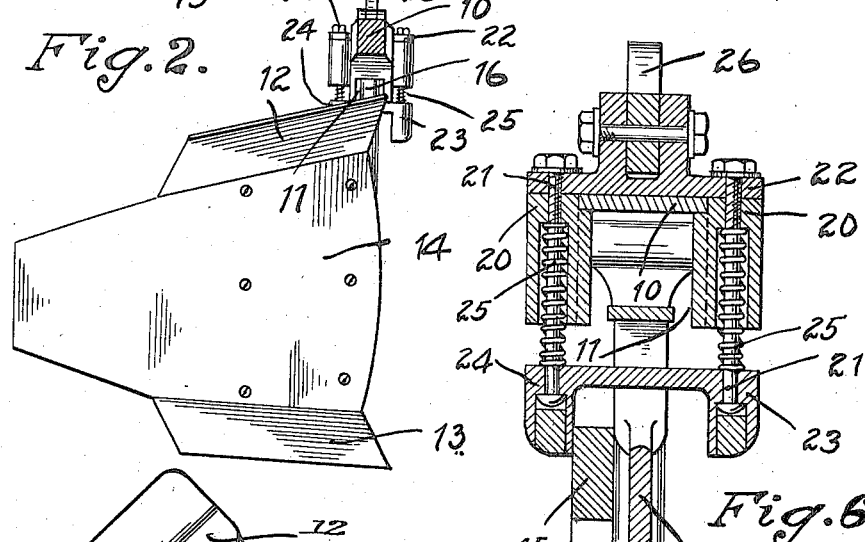
Fig. 2.
Fig. 6.
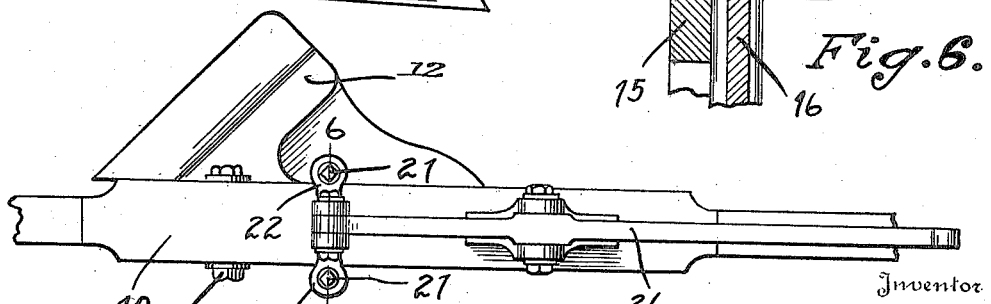
Fig. 5
Witnesses
M. S. Watson
Henry T. Bright
Inventor
W. Bahmuller
By 
Attorneys

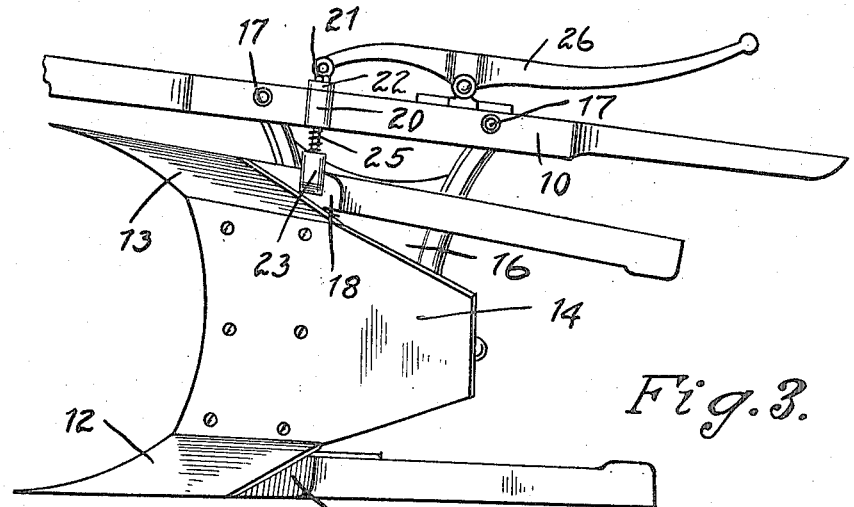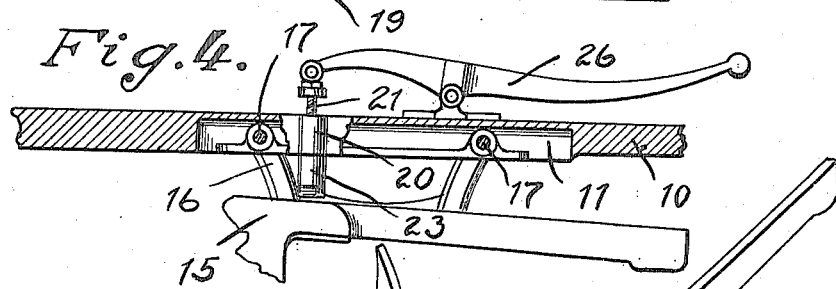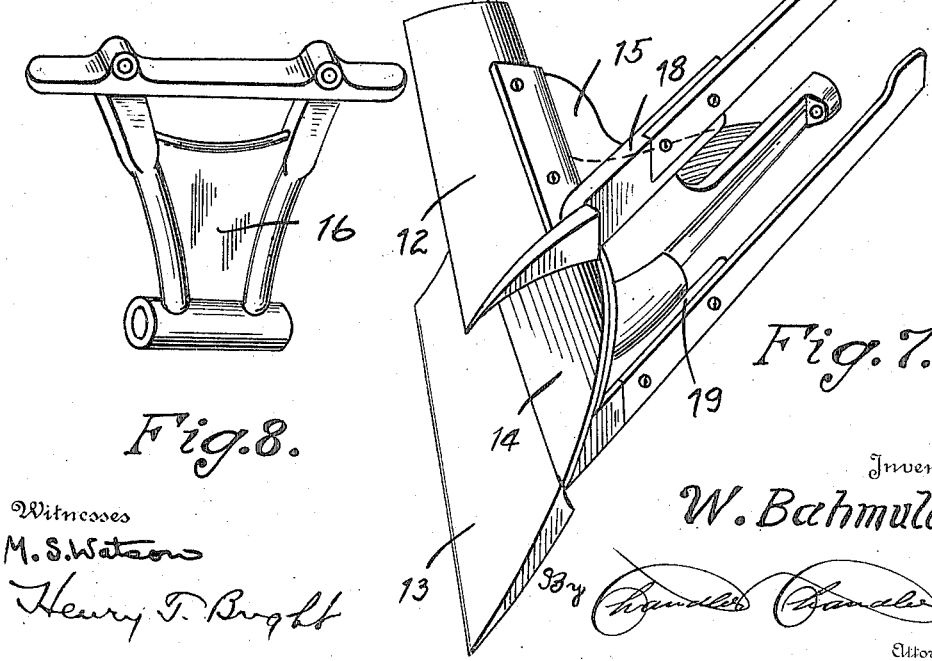

UNITED STATES PATENT OFFICE.

WILHELM BAHMULLER, OF YOUNGSTOWN, OHIO.

PLOW.

1,166,169.   Specification of Letters Patent.   Patented Dec. 28, 1915.

Application filed April 29, 1914.   Serial No. 835,227.

*To all whom it may concern:*

Be it known that I, WILHELM BAHMULLER, a subject of Hungary, residing at Youngstown, in the county of Mahoning, State of Ohio, have invented certain new and useful Improvements in Plows; and I do hereby declare the following to be a full, clear, and exact description of the invention, such as will enable others skilled in the art to which it appertains to make and use the same.

This invention relates to plows and particularly to the type known as side hill or reversible plows.

The object of the invention resides in the provision of a plow embodying two shares mutually connected by a mold board and so connected to the beam of the plow that either of the shares may be disposed in operative relation so that the plow can be operated back and forth along the same edge of the field.

A further object of the invention resides in the provision of a plow of the character named which embodies an improved construction of means for locking either share in operative position, said means being manually releasable when desired.

With the above and other objects in view the invention consists in the details of construction and in the arrangement and combination of parts to be hereinafter more fully described and particularly pointed out in the appended claim.

In describing the invention in detail reference will be had to the accompanying drawing wherein like characters of reference denote corresponding parts in the several views, and in which:

Figure 1 is a side elevation of a fragment of a plow constructed in accordance with the invention. Fig. 2; a front view of what is shown in Fig. 1. Fig. 3; a view similar to Fig. 1 with the plow in reversed position.
Fig. 4; a partial longitudinal section of the plow. Fig. 5; a partial plan view of what is shown in Fig. 1. Fig. 6; a section on the line 6—6 of Fig. 5. Fig. 7; a perspective view of the journal bracket which is secured to the mold board and shares, and Fig. 8; a perspective view of the standard.

Referring to the drawing the improved plow is shown as comprising a beam 10 provided with a longitudinal recess 11 on its under side. The improved plow further embodies left and right hand shares 12 and 13 respectively which are mutually connected by a common mold board 14, said mold board being secured at opposite sides to respective inner edges of the shares. Mounted upon the mold board 14 and shares 12 and 13 and serving to secure the mold board and shares together is a bracket 15 to which is pivoted the lower end of a standard 16, the upper end of said standard being secured in the recess 11 by means of bolts 17. Secured to the bracket 15 at opposite sides of the latter respectively are arms 18 and 19, said arms extending rearwardly. Formed on opposite sides of the beam 10 are vertically disposed tubular members 20 respectively in each of which is slidable a bolt 21. The upper ends of the bolts 21 are connected by a bridge plate 22, while the lower ends of said bolt are secured to an inverted U-shaped member including arms 23 and 24. The U-shaped member including the arms 24 and 23 is normally held in its lowermost position by means of springs 25. When the share 13 is disposed in operative position the arm 24 will engage against the rear side of the bracket 15 and lock the mold board and shares against pivotal movement. When the share 12 is disposed in operative position the arm 23 will engage against the rear side of the bracket 15 and lock the mold board and shares against pivotal movement.

In order to effect disengagement of the arms 23 and 24 from the bracket 15 to reverse the position of the shares 12 and 13 there is pivoted on the top of the beam 10 a lever 26 the forward end of which is pivotally connected to the plate 22 so that by depressing the rear end of said lever the arms 23 and 24 may be raised out of locking position to permit reversal of the plow.

What is claimed, is:—

In a plow, the combination of a beam, a standard secured to said beam, tubular members mounted on either side of the beam, bolts slidable in the bores of said members a U-shaped latch mutually connecting the lower ends of said bolts, spring means normally holding said latch in its lowermost position, a bracket pivoted to the lower end of the standard and adapted to be engaged by the latch at the limit of its movement in either direction, a pair of shares secured to said bracket, and a mold board between said shares.

In testimony whereof, I affix my signature, in the presence of two witnesses.

WILHELM BAHMULLER.

Witnesses:
GEO. ZINZ,
SOPHYE N. ZERSKY.

Copies of this patent may be obtained for five cents each, by addressing the "Commissioner of Patents, Washington, D. C."